US009881068B2

(12) United States Patent
Yeap et al.

(10) Patent No.: US 9,881,068 B2
(45) Date of Patent: Jan. 30, 2018

(54) SYSTEM AND METHOD FOR CROSS-REFERENCING INFORMATION IN AN ENTERPRISE SYSTEM

(75) Inventors: Hwee Har Yeap, San Mateo, CA (US); Raj Devireddy, Bowie, MD (US); Chiun-Feng Hsiao, Belmont, CA (US); Ming-Tao Liou, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 3317 days.

(21) Appl. No.: 11/401,790

(22) Filed: Apr. 3, 2006

(65) Prior Publication Data

US 2006/0200830 A1    Sep. 7, 2006

Related U.S. Application Data

(63) Continuation of application No. 10/183,021, filed on Jun. 27, 2002, now Pat. No. 7,743,065.

(51) Int. Cl.
*G06Q 30/02*    (2012.01)
*G06F 17/30*    (2006.01)

(52) U.S. Cl.
CPC ....... *G06F 17/30557* (2013.01); *G06Q 30/02* (2013.01)

(58) Field of Classification Search
CPC .............. G06Q 30/02; G06F 17/30557; G06F 17/30569
USPC ..... 707/1, 9, 100, 104.1, E17.124, E17.032; 709/217–224
See application file for complete search history.

(56) References Cited

U.S. PATENT DOCUMENTS

| | | | |
|---|---|---|---|
| 4,745,559 A | 5/1988 | Willis et al. | 705/37 |
| 5,363,121 A | 11/1994 | Freund | 718/101 |
| 5,410,650 A | 4/1995 | Sasaki et al. | 709/250 |
| 5,499,359 A * | 3/1996 | Vijaykumar | 707/201 |
| 5,781,741 A | 7/1998 | Imamura et al. | 709/236 |
| 5,787,416 A * | 7/1998 | Tabb et al. | 707/2 |
| 5,787,433 A * | 7/1998 | Plotkin et al. | |
| 5,793,970 A | 8/1998 | Fakes et al. | 709/216 |
| 5,794,234 A * | 8/1998 | Church et al. | |
| 5,920,705 A * | 7/1999 | Lyon | H04L 12/4608 370/409 |
| 5,956,725 A | 9/1999 | Burroughs et al. | 707/101 |
| 5,970,488 A | 10/1999 | Crowe et al. | 707/8 |
| 5,987,472 A | 11/1999 | Serafin | 707/104.1 |
| 6,034,970 A | 3/2000 | Levac et al. | 370/466 |
| 6,041,365 A * | 3/2000 | Kleinerman | G06F 9/541 719/328 |
| 6,067,548 A | 5/2000 | Cheng | 707/103 R |
| 6,088,717 A | 7/2000 | Reed et al. | 709/201 |
| 6,154,738 A * | 11/2000 | Call | 707/4 |
| 6,154,747 A * | 11/2000 | Hunt | G06F 17/30607 |

(Continued)

OTHER PUBLICATIONS

IBM Technical Disclosure Bulletin, Message Passing Protocol for Personal Computer Systems, vol. 36, Issue No. 11, pp. 553-558 (Nov. 1993).

(Continued)

*Primary Examiner* — Heather Herndon
*Assistant Examiner* — Soheila (Gina) Davanlou
(74) *Attorney, Agent, or Firm* — Sheppard Mullin Richter & Hampton LLP

(57) ABSTRACT

A system and method for enabling the cross-referencing or linking of records in an enterprise system is disclosed.

15 Claims, 6 Drawing Sheets

(56) References Cited

U.S. PATENT DOCUMENTS

| | | | | |
|---|---|---|---|---|
| 6,157,927 A | 12/2000 | Schaefer et al. | ............ | 707/103 R |
| 6,240,417 B1 | 5/2001 | Eastwick et al. | ................ | 707/10 |
| 6,243,737 B1 | 6/2001 | Flanagan et al. | .............. | 709/202 |
| 6,308,178 B1 | 10/2001 | Chang et al. | ................. | 707/100 |
| 6,366,582 B1* | 4/2002 | Nishikado | ............. | H04L 49/309 370/352 |
| 6,393,423 B1* | 5/2002 | Goedken | ......................... | 707/10 |
| 6,418,441 B1* | 7/2002 | Call | ................ | 707/10 |
| 6,427,145 B1* | 7/2002 | Hara et al. | ......................... | 707/3 |
| 6,438,584 B1* | 8/2002 | Powers | ......................... | 709/206 |
| 6,560,219 B1* | 5/2003 | Tabu et al. | .................... | 370/352 |
| 6,626,957 B1 | 9/2003 | Lippert et al. | ................. | 715/513 |
| 6,636,875 B1 | 10/2003 | Bashant et al. | ................. | 707/201 |
| 6,697,809 B2 | 2/2004 | Chen et al. | ..................... | 707/10 |
| 6,725,239 B2 | 4/2004 | Sherman et al. | ............ | 707/201 |
| 6,732,109 B2 | 5/2004 | Lindberg et al. | ............. | 707/101 |
| 6,757,739 B1 | 6/2004 | Tomm et al. | ................. | 709/236 |
| 6,772,143 B2 | 8/2004 | Hung | ............................... | 707/3 |
| 6,789,252 B1 | 9/2004 | Burke et al. | ................... | 717/100 |
| 6,850,893 B2 | 2/2005 | Lipkin et al. | ....................... | 705/8 |
| 6,892,210 B1 | 5/2005 | Erickson et al. | ............. | 707/201 |
| 6,912,540 B2 | 6/2005 | Kohut et al. | .................. | 707/101 |
| 6,990,636 B2 | 1/2006 | Beauchamp et al. | ......... | 715/764 |
| 6,993,745 B1 | 1/2006 | Ballantyne et al. | .......... | 717/109 |
| 7,020,869 B2 | 3/2006 | Abrari et al. | ................. | 717/108 |
| 7,024,421 B2* | 4/2006 | Mokuya et al. | ............... | 707/102 |
| 7,031,956 B1 | 4/2006 | Lee et al. | ........................... | 707/3 |
| 7,072,934 B2 | 7/2006 | Helgeson et al. | ............. | 709/203 |
| 7,089,583 B2 | 8/2006 | Mehra et al. | ...................... | 726/3 |
| 7,130,885 B2* | 10/2006 | Chandra et al. | .............. | 709/206 |
| 7,149,813 B2 | 12/2006 | Flanagin et al. | .............. | 709/248 |
| 7,243,162 B2 | 7/2007 | O'Neill et al. | ................ | 709/245 |
| 2001/0016833 A1 | 8/2001 | Everling et al. | ................ | 705/39 |
| 2002/0184444 A1 | 12/2002 | Shandony | ...................... | 711/118 |
| 2003/0046289 A1 | 3/2003 | Balasubramanian et al. | .. | 707/10 |
| 2003/0074248 A1* | 4/2003 | Braud et al. | ...................... | 705/9 |
| 2003/0140058 A1 | 7/2003 | Martin et al. | ............. | 707/103 R |
| 2003/0140068 A1 | 7/2003 | Yeung | ............................ | 707/204 |
| 2003/0167229 A1 | 9/2003 | Ludwig et al. | .................. | 705/40 |
| 2003/0187935 A1* | 10/2003 | Agarwalla et al. | ............ | 709/206 |
| 2003/0188021 A1 | 10/2003 | Challenger et al. | .......... | 709/246 |
| 2003/0217069 A1 | 11/2003 | Fagin et al. | .................. | 707/102 |
| 2004/0059672 A1* | 3/2004 | Baig et al. | ....................... | 705/40 |

OTHER PUBLICATIONS

Microsoft Press Computer Dictionary, Microsoft Press, Third Edition, pp. 57, 280, 281, 305, 400 (1997).

\* cited by examiner

SYSTEM AND METHOD FOR CROSS-REFERENCING INFORMATION IN AN ENTERPRISE SYSTEM

CROSS REFERENCE TO RELATED APPLICATIONS

This application is a Continuation Application of U.S. patent application Ser. No. 10/183,021, filed Jun. 27, 2002, now U.S. Pat. No. 7,743,065 entitled, "System And Method For Cross-referencing Information In An Enterprise System," by Hwee-Har Yeap et al., and which is hereby incorporated by reference in its entirety.

BACKGROUND OF THE INVENTION

This invention relates generally to the field of data processing, and more particularly, to cross-referencing techniques for identifying records across multiple applications.

As technology continues to advance and the business environments have become increasingly complex and diverse, more and more companies have relied on various software and eBusiness applications to conduct and manage various aspects of their enterprise business. In general, eBusiness applications are designed to enable a company or enterprise to conduct its business over an interactive network (e.g., Internet, Intranet, Extranet, etc.) with its customers, partners, suppliers, distributors, employees, etc. eBusiness applications may include core business processes and supply chain, back-office operations.

In many industries, the availability and completeness of information is critical to the operation of a business. Many businesses need immediate access to customer information, which can be used to increase customer satisfaction and overall profitability of an enterprise. In order to provide a cohesive customer-centric environment, the customer data residing in an eBusiness application or system is integrated with data residing within various legacy systems, including back office policy, claims, and billing systems. Thus, interfaces between eBusiness applications and legacy operational systems that contain vast stores of valuable customer information have been developed.

Typically, an eBusiness application and a legacy system each includes a database that contains information. In one example, the eBusiness application and the legacy system can be insurance related systems that have insurance related customer information in their databases.

Communications between an eBusiness application and a legacy system can be achieved by the exchange of messages. One type of message is a request by one system for customer data from another system. Another type of message is a response to such a request or an update of customer data from one system to another system.

The messages can be in any type of format that can be processed by the eBusiness and legacy systems. For example, messages can be formatted in a markup language such as Extensible Markup Language (XML). XML describes a class of data objects that are referred to as XML documents, and partially describes the behavior of computer programs that process them. XML is a subset of a markup language known as Standard Generalized Markup Language. XML as referenced herein refers generally to any standard of XML, and specifically to XML 1.0, as set forth on the web site http://www.w3.org.

Often times the information stored in an eBusiness application database is in a different format or arrangement than the related information stored in a corresponding legacy system database. In some systems, customer information associated with an eBusiness application can be stored in a database across several different tables. For example, customer name information can be stored in one table, customer address information can be stored in another table and customer account information can be stored in yet another table. The related customer information in the legacy system database is stored in a different format, such as a single table.

Thus, communications between an eBusiness application and a legacy system have been difficult because of the different formats of information. Conventional eBusiness applications lack the capability to identify and link records during the execution of different business processes and transactions.

In conventional applications, scripts that hard code links between object ids were required to link or associate records. Each legacy system required one or more separate customized scripts which usually could not be used with any other system or database. Moreover, in some systems, it became necessary to develop a script for each individual record.

What is therefore needed is a technique that enables the cross-referencing or linking of customer information between multiple systems. What is also needed is a technique that reduces the potential for data corruptions and conflicts within an enterprise.

SUMMARY OF THE INVENTION

The present invention provides a system and method for enabling the cross-referencing or linking of records in an enterprise system. In one embodiment, cross-referencing information can be included in the header of a message between applications or systems in an enterprise system.

DETAILED DESCRIPTION OF THE INVENTION

Figure 1:
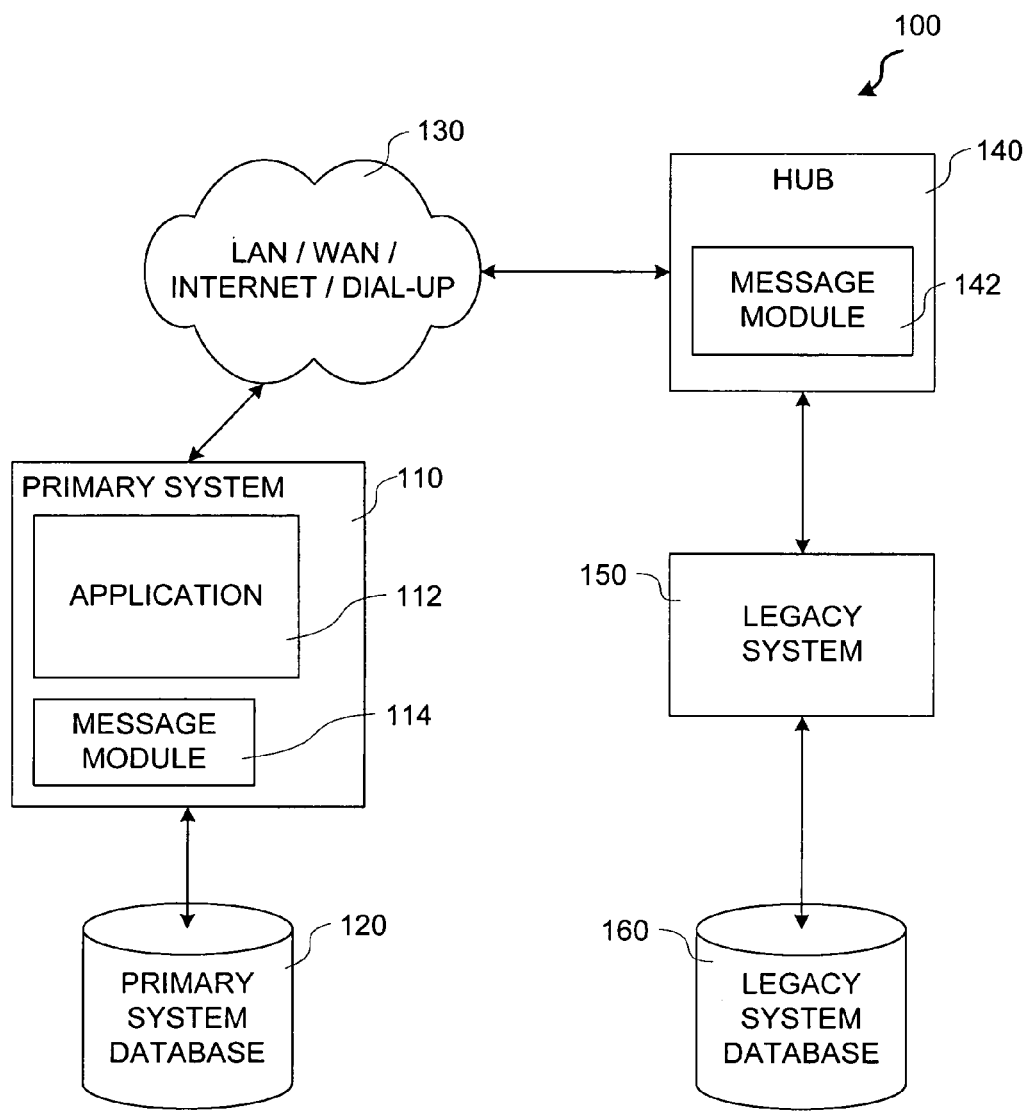
FIG. 1 illustrates an operating environment in which the invention can be practiced.

The present invention relates to a technique of cross-referencing customer information. In one embodiment, the cross-referencing technique can be used in an eBusiness application or system to identify records during the execution of a business process or a transaction. The same data record can be referenced by multiple systems within an enterprise by using an identifier that is generated and associated with the record.

The method of the present invention includes the normalization of messages between an eBusiness application and a legacy system. Each message typically includes a header and a body. The relevant data objects in the body to be cross-referenced are identified. An identifier is generated for and associated with one of the data objects. A header cross-referencing or association section for each object id is generated and inserted in the header of the message.

An exemplary implementation of the present invention relates to the management of customer information across an organization or enterprise. The following implementation is intended to be exemplary only and not limiting on the present invention in any manner.

A Party Management System is a data service that allows businesses to manage, synchronize, and coordinate customer information across an enterprise. The Party Management System can be a front-end application in an eBusiness network or system. The Party Management System can also be a complete master customer repository solution, a system of record, or a customer reference database for other applications in a particular enterprise.

In one embodiment, the Party Management System interacts with systems across the enterprise as the system of record for customer data. The Party Management System enables organizations to leverage customer relationship management data from a variety of legacy and third party applications. The Party Management System allows companies to manage, share, synchronize, and access customer information across disparate applications, multiple business units, and diverse product lines through a front-end interface.

In one embodiment, the cross-referencing of customer identification according to the present invention enables organizations to store the customer identification from external systems with the Party Management System. Thus, mapping of customer records or profiles across multiple systems throughout an enterprise can be achieved. The Party Management System includes inbound and outbound business processes that populate external customer identifiers and utilize the cross-referencing infrastructure to send appropriate customer identifiers to applications that make data requests.

In the illustrated embodiment, an eBusiness application can create a universally unique identifier (UUID) for each new record that is created in a Party Management System. The UUID can be unique across multiple eBusiness applications as well as other applications connected to the Party Management System. The exemplary message discussed below includes several UUIDs in the header of the message.

A schematic diagram of an embodiment of an enterprise system according to the present invention is illustrated in FIG. 1.

The enterprise system 100 includes a primary system or data system 110. The term "primary system" is used generically to represent or encompass one or more eBusiness applications or systems that are run on one or more conventional servers. In one example, the primary system 110 includes an eBusiness application 112. In alternative examples, the primary system 110 may include multiple eBusiness applications 112.

The enterprise system 100 also includes a primary system database 120 that is connected to or associated with the primary system 110. Database 120 generally represents a single database or a series of tables of information, and can be any type of database, such as a relational database, an object-oriented database, etc.

The primary system 110 includes a message module 114 that generates outgoing messages from primary system 110 and processes incoming messages to primary system 110. The function of the message module 114 is described in greater detail below.

The enterprise system 100 includes a legacy system 150 and an associated legacy system database 160. The legacy system 150 generically represents one or more applications or systems that can be run on one or more conventional servers.

The legacy system database 160 is connected to or associated with the legacy system 150. Database 160 generally represents a single database or a series of tables of information and can be any type of database, such as a relational database, an object-oriented database, flat files, etc.

In one example, the primary system 110 and the legacy system 150 are related to the insurance industry. For example, the primary system 110 can include information about particular entities, such as customers, and can be tied to customer relations management. Similarly, the legacy system 150 can include information about insurance policies. Thus, in this example, the information stored in the primary system database 120 and in the legacy system database 160 contains information that is related to a common entity or customer.

In this example, the legacy system 150 can include Siebel Insurance Application Architecture that uses XML vocabulary specified by the Customer Relation Management Markup Language (CRMML). The CRMML architecture provides shared semantic and content structures across all applications in an enterprise.

In one example, the enterprise system 100 includes a hub 140 that is located between the primary system 110 and the legacy system 150. The hub 140 includes a message module 142 that receives, processes, and forwards messages between the primary system 110 and the legacy system 150. The function of the message module 142 is described in greater detail below. An exemplary hub that can be used is Siebel CIF Application, which has a message module to handle CRMML messages, a cross-reference module to process cross-reference information, and a routing module to dispatch the messages to a destination application.

In this example, the primary system 110 is connected to the hub 140 and the legacy system 150 via communication 130. The legacy system 150 also communicates with primary system 110 via hub 140 and communication 130. Communication 130 may be any type of connection or mode of communication that enables communication between the components of the enterprise system 100. For example, communication 130 can be accomplished via a local area network (LAN), a wide area network (WAN), the Internet, a dial-up connection, or any other type of communication. It will be appreciated that hub 140 may be located on either side of communication 130.

Referring back to the databases 120 and 160, the information in the primary system database 120 and in the legacy system database 160 can include information such as customer information, account information, policy information (such as premiums and types), etc. The manner in which the information is stored can vary between the primary system database 120 and the legacy system database 160. Some information can be stored in one or more tables in a database. Each table can be based on a set of relationships in a database. Furthermore, in one example, some information is only stored in either one of the system's database but not both.

A number of fields of data or information in a table can be referred to as an object. For example, in a table format, multiple columns of data in the table correspond to an object. Some examples of objects can include: account information; customer name; and customer address. The particular subset of data that is stored in an object can be referred to as an object component.

In the insurance application example, some exemplary insurance specific objects that can be stored in legacy system database 160 include parties, policies, and claims. Some exemplary eBusiness objects that can be stored in primary system database 120 include contacts, accounts, policies, and claims.

Figure 2A:
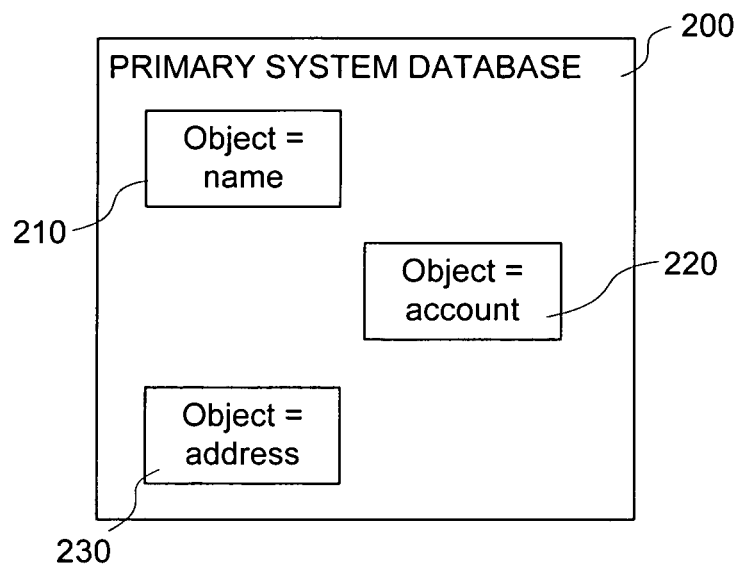
FIG. 2A illustrates a representation of information stored in an exemplary table in a primary system database.

An exemplary storage structure for a primary system database is illustrated in FIG. 2A. In this example, the primary system database 200 includes multiple tables of information associated with different objects. As illustrated, the database 200 includes a name table 210, an account table 220, and an address table 230. The name table 210 corresponds to a name object. The account table 220 corresponds to an account object. The address table 230 corresponds to an address object. Each of the object tables in turn has an object id associated with each record stored in individual tables. It will be appreciated that database 200 may include any number of tables.

Figure 2B:
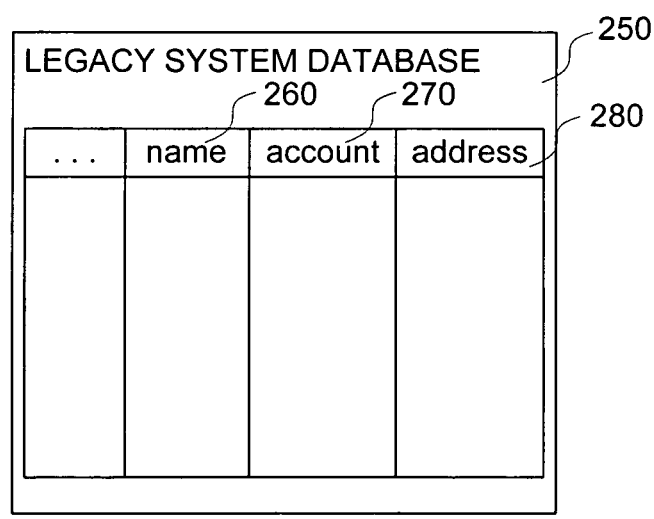
FIG. 2B illustrates a representation of information stored in an exemplary table in a legacy system database.

An exemplary storage structure for the legacy system database is illustrated in FIG. 2B. In this example, the legacy system database 250 includes a single table that includes multiple object entries. As illustrated, the table includes a name object column 260, an account object column 270, and an address object column 280. It will be appreciated that database 250 may include any number of object columns.

In one example, when the primary system 110 wants to request information (such as claim type, deductible, etc.) related to a particular customer, the message module 114 prepares and sends a message with the request to the legacy system 160. The message is received and processed by the legacy system 160. The legacy system 160 generates a message in response with the requested information. The primary system 110 can update the primary system database 120 with the information from the legacy system 160.

In one example, the primary system 110 or the message module 114 generates the content of the message, including the envelope, the header, and the body. The message can be generated in any conventional manner. The body of the message can be referred to as a transaction instance. A transaction instance is a business process such as the addition of a person record to a database. A person record in a database typically includes several individual object records from multiple physical tables. These records can be referred to as data object instances or objects. Some examples of such records include a name record, an address record, etc.

Some examples of messages are illustrated and described below. The first message is exemplary of a conventional message that can be generated by the primary system 110. As set forth below this message includes the values or identifiers of object ids that exist in the primary system database 120.

| Message Without Cross-Referencing Information |
| --- |

| Line | Code |
| --- | --- |
| 1 | <?xml version="1.0" encoding="UTF-8" ?> |
| 2 | <CRMMessage id="E7327072" sessionId="70175837" |
| 3 | bodyType="CRMML for Claim Service" timeStampCreated="2000-12-14 14:57:40.875" |
| 4 | sourceSystem="Primary System" |
| 5 | destinationSystem="Insurance Application Server" |
| 6 | <CRMHeader> |
| 7 | <DefaultCurrency>USD</DefaultCurrency> |
| 8 | </CRMHeader> |
| 9 | <ClaimService> |
| 10 | <AddFirstNoticeOfLossRequest cmdType="request" |
| 11 | id="CMDRESP5"> |
| 12 | <ClaimFolder> |
| 13 | <id>123450005</id> |
| 14 | <claimNumber>120001214145712453</claimNumber> |
| 15 | <FinancialServicesAgreement> |
| 16 | <id>123450007</id> |
| 17 | <PhysicalDocument> |
| 18 | <id>123450006</id> |
| 19 | <description>The death certificate is on |
| 20 | file</description> |
| 21 | <type>Outstanding requirements</type> |
| 22 | </PhysicalDocument> |
| 23 | <Coverage> |
| 24 | <id>123450008</id> |
| 25 | <RelatedAmount> |
| 26 | <id>123450010</id> |
| 27 | <amount>1,000,000</amount> |
| 28 | <type>Death Benefit</type> |
| 29 | </RelatedAmount> |
| 30 | </Coverage> |
| 31 | <Coverage> |
| 32 | <id>123450009</id> |
| 33 | <RelatedAmount> |
| 34 | <id>123450010</id> |
| 35 | <amount>1,000,000</amount> |
| 36 | <type>Death Benefit</type> |
| 37 | </RelatedAmount> |
| 38 | </Coverage> |
| 39 | </FinancialServicesAgreement> |
| 40 | </ClaimFolder> |
| 41 | </AddFirstNoticeOfLossRequest> |

| Message Without Cross-Referencing Information | |
|---|---|
| Line | Code |
| 42 | </ClaimService> |
| 43 | </CRMMessage> |

This message is based on XML architecture and is not intended to be limiting in any respect. Other messages generated by message module 114 may have different content, a different number of objects, etc. Alternatively, a different markup language can be used to structure the content of the message.

This message includes a declaration at line 1. The declaration defines the XML version and the character encoding used in the message. In this example, the message conforms to the 1.0 specification of XML and uses the UTF-8 character set.

The message also includes a message envelope at lines 2-5 and a header section at lines 6-8. The header sets forth general information relating to the message. The envelope includes a body type definition at line 3. In this example, the body type definition is the CRMML for insurance claim service architecture.

The message also includes a body section at lines 10-41. The body contains text that forms a transaction instance. As noted above, the CRMML for claim service architecture is associated with the insurance industry. As a result, some of the elements or object ids in the text of the body are typical of elements in messages sent by or received by insurance applications. While the CRMML for claim service architecture is illustrated in this example, any architectural standard can be used.

The elements in the body of the message are defined by tags. For simplicity, the elements in the body are referenced herein with respect to the corresponding line numbers and not the associated tags.

The body includes a claim folder element at lines 12-40. The claim folder element includes an id element at line 13. In this example, the id element has a value of 123450005. This value represents a particular object id of a record in the primary system database 120, such as a claim entity record.

The claim folder element includes a claim number element at line 14. In this example, the claim number element has a value of 120001214145712453. This value is an identifier that can represent a particular insurance claim.

The body includes a financial services agreement element at lines 15-39. At line 16, the financial services agreement element includes an id element. In this example, the id element has a value of 123450007, which is different than the value of the id element at line 13. The id elements in lines 13 and 16 are different because they represent different types of objects or records in the primary system database 120.

The body includes a physical document element at lines 17-22. At line 18, the physical document element includes an id element that has a value of 123450006. This id element identifies a unique physical document record or object in which information relating to the types of documents for different customers can be stored in the primary system database 120.

The body also includes a coverage element at lines 23-30. At line 24, the coverage element includes an id element that has a value of 123450008. The coverage element also includes a related amount element at lines 25-29. At line 26, the related amount element includes an id element that has a value of 123450010.

The body includes another coverage element at lines 31-38. At line 32, this coverage element includes an id element that has a value of 123450009. This coverage element includes a related amount element at lines 33-37. At line 34, the related amount element includes an id element that has a value of 123450010, similar to the value of id element 150. When id elements in a message have the same value, they represent the same record in the primary system database 120.

As described above, this exemplary message generated by the message module 114 of the primary system 110 contains the primary system's identifiers for the object in the form of object ids or id elements present in the message. When this message is sent to the legacy system 160, the legacy system 160 is not able to process the message unless it can associate the primary system object ids with the object ids in its own system. Accordingly, a script with hard code links between the object ids of the primary system 110 and the object ids of the legacy system 150 is needed in order for the legacy system 150 to process the message. Each time the legacy system 150 receives a message from the primary system 110 or a different system, links between any unassociated object ids of the primary system 110 are needed. The process of continuously developing and writing links is time intensive and expensive.

The cross-referencing technique of the present invention obviates the need for hard code links to be written for each system and for each message that contains unlinked object ids. A message with cross-referencing information contains the necessary information to link object ids between different systems and applications.

An exemplary message with cross-referencing information is set forth below. This message is generated using XML architecture, similar to the first message discussed above. This message is referred to as the second message.

This message corresponds to the first message in that it contains the same information as the first message. In addition, this message includes cross-referencing information between object ids of the primary system 110 and object ids of the legacy system 150.

| Message Without Cross-Referencing Information |
|---|

| Line | Code |
|---|---|
| 1 | <?xml version="1.0" encoding="UTF-8" ?> |
| 2 |   <CRMMessage id="E7327072" sessionId="70175837" |
| 3 |     bodyType="CRMML for Claim Service" timeStampCreated="2000-12-14 14:57:40.875" |
| 4 |     sourceSystem="Primary System" |
| 5 |     destinationSystem="Insurance Application Server" |
| 6 |     <CRMHeader> |
| 7 |       <DefaultCurrency>USD</DefaultCurrency> |
| 8 |     <CrfKeyGroup destinationLogicalId="Claim" |
| 9 |     crfCmdMode="alwaysRespond" crfPublish="true" |
| 10 |     bodyCategory="AddLifeClaimResponse"> |
| 11 |       <CommandReference refid="CMDRESP5" /> |
| 12 |       <KeyGroup keyGroupType="ClaimFolder" id="K1"> |
| 13 |         <UUID>20001214145742796001</UUID> |
| 14 |         <AlternateId sourceLogicalId="Party" state="added" |
| 15 |           value="120001214145712453" /> |
| 16 |         <AlternateId sourceLogicalId="Siebel" state="added" |
| 17 |           value="123450005" /> |
| 18 |       </KeyGroup> |
| 19 |       <KeyGroup keyGroupType="PhysicalDocument" id="K3"> |
| 20 |         <UUID>20001214145743296001</UUID> |
| 21 |         <AlternateId sourceLogicalId="Party" state="added" |
| 22 |           value="120001214145728234" /> |
| 23 |         <AlternateId sourceLogicalId="Siebel" state="added" |
| 24 |           value="123450006" /> |
| 25 |       </KeyGroup> |
| 26 |       <KeyGroup keyGroupType="InsurancePolicy" id="K7"> |
| 27 |         <UUID>20001214145743639999</UUID> |
| 28 |         <AlternateId sourceLogicalId="Party" state="added" |
| 29 |           value="120001214145731359" /> |
| 30 |         <AlternateId sourceLogicalId="Siebel" state="added" |
| 31 |           value="123450007" /> |
| 32 |       </KeyGroup> |
| 33 |       <KeyGroup keyGroupType="RelatedAmount" id="K14"> |
| 34 |         <UUID>20001214145744092998</UUID> |
| 35 |         <AlternateId sourceLogicalId="Party" state="added" |
| 36 |           value="120001214145723593" /> |
| 37 |         <AlternateId sourceLogicalId="Siebel" state="added" |
| 38 |           value="123450008" /> |
| 39 |       </KeyGroup> |
| 40 |       <KeyGroup keyGroupType="CausedEvent" id="K2"> |
| 41 |         <UUID>20001214145744389999</UUID> |
| 42 |         <AlternateId sourceLogicalId="Party" state="added" |
| 43 |           value="120001214145714218" /> |
| 44 |         <AlternateId sourceLogicalId="Siebel" state="added" |
| 45 |           value="123450010" /> |
| 46 |       </KeyGroup> |
| 47 |       <KeyGroup keyGroupType="RelatedAmount" id="K10"> |
| 48 |         <UUID>20001214145744389999</UUID> |
| 49 |         <AlternateId sourceLogicalId="Party" state="added" |
| 50 |           value="120001214145714299" /> |
| 51 |         <AlternateId sourceLogicalId="Siebel" state="added" |
| 52 |           value="123450009" /> |
| 53 |       </KeyGroup> |
| 54 |     </CrfKeyGroup> |
| 55 |     </CRMHeader> |
| 56 |     <ClaimService> |
| 57 |       <AddFirstNoticeOfLossRequest cmdType="request" |
| 58 |         id="CMDRESP5"> |
| 59 |         <ClaimFolder> |
| 60 |           <KeyGroup refid="K1" /> |
| 61 |           <claimNumber>120001214145712453</claimNumber> |
| 62 |           <FinancialServicesAgreement> |
| 63 |             <KeyGroup refid="K7" /> |
| 64 |             <PhysicalDocument> |
| 65 |             <KeyGroup refid="K3" /> |
| 66 |             <description>The death certificate is on |
| 67 |             file</description> |
| 68 |             <type>Oustanding requirements</type> |
| 69 |             </PhysicalDocument> |
| 70 |             <Coverage> |
| 71 |               <KeyGroup refid="K14" /> |
| 72 |               <RelatedAmount> |
| 73 |                 <KeyGroup refid="K2" /> |
| 74 |                 <amount>1,000,000</amount> |
| 75 |                 <type>Death Benefit</type> |
| 76 |               </RelatedAmount> |

| Message Without Cross-Referencing Information | |
|---|---|
| Line | Code |
| 77 | </Coverage> |
| 78 | <Coverage> |
| 79 | <KeyGroup refid="K10" /> |
| 80 | <RelatedAmount> |
| 81 | <KeyGroup refid="K2" /> |
| 82 | </RelatedAmount> |
| 83 | </Coverage> |
| 84 | </FinancialServicesAgreement> |
| 85 | </ClaimFolder> |
| 86 | </AddFirstNoticeOfLossRequest> |
| 87 | </ClaimService> |
| 88 | </CRMMessage> |

This message is representative of a message that has been sent from the primary system 110 to the hub 140 and subsequently processed by message module 142. Thus, this message is exemplary of a message that a receiving system such as legacy system 150 would receive. The particular information added by the hub 140 is identified and discussed below.

This message includes a declaration at line 1, an envelope section at lines 2-5, a header section at lines 6-55, and a body section at lines 57-86. In this message, the declaration defines the same XML version and character encoding that was used in the first message.

In this example, the header in the second message is structured differently than the header in the first message. The header in the second message includes several cross-referencing sections with information that is generated by the message module 114 of the primary system 110 and the message module 142 of the hub 140. The cross-referencing sections contain information related to the bodies of the first and second messages as described in detail below.

In a first example, the relationship between the claim folder element at lines 12-40 in the first message (particularly line 13), the cross-referencing section or key group element at lines 12-18 in the header of the second message, and the claim folder element at lines 59-85 in the body of the second message is described.

Initially, during an exemplary message generation process, the message module 114 reviews the body of the message prior to transmission. The first message above is an example of such a message. The message module 114 identifies the particular objects or object ids in the body of that message that should be cross-referenced or linked with object ids of a receiving system.

Because the message is being sent to the legacy system 150, by the time that the legacy system 150 receives the message, typically all of the object ids should be cross-referenced between systems in the header. The message module 114 determines which object ids in the body of the first message do not include any corresponding cross-referencing information in the header of the message to be sent to the hub 140.

The review of the object ids in the body and the cross-referencing of only those object ids not previously cross-referenced is referred to as selective promotion. Selective promotion reduces unnecessary promotions in the message. As a result, if a table or database is large, then processing the message is slowed down by unneeded promotions.

The message module 114 generates a cross-referencing section for each object id to be referenced in the header of the message. The message module 114 creates a reference identifier for each object id to be referenced. A reference identifier is included in each cross-referencing section. Each reference identifier functions as an "alert" that informs the receiving system that it has to "unpack" the information in the body of the message.

In this example, the message module 114 identifies the id element at line 13 in the claim folder element of the first message. As previously discussed, this id element has a value of 123450005, which is representative of an object id in a database of the primary system 110. The message module 114 associates a generic reference identifier, such as K1, with that id element and temporarily stores the association.

The message module 114 generates a portion of a cross-referencing section that is inserted into the header of the modified message. Note that the message module 114 of the primary system 110 inserts a portion of each cross-referencing section illustrated in the second message and the message module 142 of the hub 140 inserts the remainder. The insertion of the cross-referencing information in lines 13-19 into the header is referred to as the promotion of the cross-referencing information.

An exemplary cross-referencing section is shown in the second message at lines 12-18. The cross-referencing section includes information that corresponds to the identified id element and its associated reference identifier such as K1.

In particular, the message module 114 inserts the primary system object id and the associated generic reference identifier into the header. An example of such information is illustrated at lines 16-17 of the second message. In this example, the system id of the primary system 110 is identified as "Siebel," which is stored as the AlternateId sourceLogicalId in line 16. In line 17, a particular object id, whose value is 123450005, of the primary system 110 is referenced. Thus, the object id of 123450005 is associated with Siebel, which in this example is the system id for the primary system 110.

Also in line 16 is the state of the particular identifying information. In this message, the state of the "Siebel" system id is "added." The state of any id or identifier can be changed by modifying or deleting the same in a cross-referencing section. The insertion of the cross-referencing information in lines 12-18 into the header is referred to as the promotion of the cross-referencing information.

The message module 114 also removes each object id instance from the body of the message and replaces it with a reference identifier, such as K1. The message module 114 extracts the object id 123450005 from line 13 of the first message and replaces it with K1 in line 60 in the second message.

In this example, the hub 140 receives the modified message from the primary system 110. The message contains one or more cross-referencing sections in the header. Each cross-referencing section contains a system id of the primary system 110, a primary system object id, and a corresponding generic reference identifier.

The message module 114 creates an element with tags that includes the reference identifier K1. This element is inserted into the body of the first message at the location of the object id with which it is associated. An example of this element is shown in line 60 of the second message.

The hub 140 is provided with the system ids for the primary system 110 and the legacy system 150 before any real time operations occur. In one example, the primary system 110 and the legacy system 150 are pre-registered with the hub 140 as the point of integration.

When the hub 140 receives a message, the hub 140 identifies the system id, which in this example is Siebel. The hub 140 also identifies each primary system object id and stores it in its memory, for example in a table.

The hub 140 generates a unique universal identifier (UUID) that it subsequently associates with each primary system object id. The hub 140 inserts each UUID into the corresponding cross-referencing section of the header of the message. In this example, the cross-referencing section at lines 12-18 includes a UUID of 20001214145742796001 in line 13.

The hub 140 also maintains the relationship between each set of ids which includes a legacy system object id, a UUID, and a primary system object id. In one example, if the hub 140 contains the legacy system object ids that correspond to the primary system object ids in a message that the hub 140 receives, then the hub 140 can insert each legacy system object id into the appropriate cross-referencing section in the message prior to forwarding the message to the legacy system 150.

In one example, the legacy system object ids and their relationships to the UUIDs and/or to the primary system object ids can be pre-programmed into the hub 140. Alternatively, when the legacy system 150 responds with a message to the primary system 110, the hub 140 extracts the legacy system object ids from the header of the message and stores the relationships between them, the UUIDs, and the primary system object ids for future use.

This exemplary cross-referencing section at lines 12-18 of the second message also includes the system id for the legacy system 150 and a legacy system object id in lines 14-15. In this example, the system id of the legacy system 150 is identified as "Party," which is stored as the AlternateId sourceLogicalId in line 14. In line 15, the object id (120001214145712453) of the legacy system 150 is referenced. Thus, the object id of 120001214145712453 is associated with Party, which in this example is the legacy system 150.

When a receiving system receives a message from the hub 140 and reviews the content of the message, it identifies any reference identifiers, such as K1, in the header. When the receiving system identifies a reference identifier, it determines that it must review the body of the message to associate information in the header corresponding to the reference identifier with the information in the body corresponding to the reference identifier.

In this example, as the legacy system 150 reviews and processes the body of the second message, the legacy system 150 utilizes the information in the header cross-referencing section with K1 when it identifies the reference identifier K1 in the body. Once the association is made, the legacy system 150 can process the business transaction of the message. This process can be referred to as "de-normalizing" or "unpacking" the message.

Regarding object ids, in one example, if the legacy system 150 has relationship information between the UUIDs inserted into the header by the hub 140 and its own object ids, then the legacy system 150 can utilize the UUIDs to determine the particular legacy system object ids for this business transaction. In this example, the hub 140 does not contain the legacy system object ids until the legacy system 150 responds to the primary system 110 via the hub 140 and the hub 140 extracts the legacy system object ids from the message.

In another example, the legacy system object ids can be pre-programmed or pre-registered into the hub 140. In this example, the legacy system 150 will see its own object ids and will be able to process the business transaction on that basis.

Another example of the creation and promotion of a cross-referencing section for a message is described. In this example, the body of a message includes multiple object ids that are the same. For example, the relationship between the related amount element (particularly lines 26 and 34) in the first message, the cross-referencing section at lines 40-46 in the header of the second message, and the related amount elements at lines 72-76 and lines 80-82 in the body of the second message is described.

In this example, the message module 114 identifies the id element at line 26 in the first related amount element of the first message. As previously discussed, this id element has a value of 123450010, which is representative of an object id in a database of the primary system 110. The message module 114 associates a generic reference identifier such as K2, with that id element and temporarily stores the association.

The message module 114 also identifies the id element at line 34 in the second related amount element of the same first message. This id element has a value of 123450010, similar to the id element at line 26. As a result, the message module 114 can associate K2 with the id element at line 34 as well. Thus, in this example, multiple object ids in the body can be promoted into the header via a single cross-referencing section.

An exemplary cross-referencing section that is related to the id elements in lines 26 and 34 in the first message is shown in the second message at lines 40-46. This cross-referencing section includes information that corresponds to these two id elements and their associated reference identifier K2, each of which is inserted into the header by the message module 114. An example of such information is illustrated at lines 44-45 of the second message.

In this example, at line 45 of the second message, the primary system object id (123450010) is referenced. In this example, the primary system 110 is identified as "Siebel," which is stored as the AlternateId sourceLogicalId in line 44. Thus, the object id of 123450010 is associated with Siebel, which in this example is the primary system 110.

The message module 114 removes the object id from the body of the message and replaces it with a reference identifier, such as K2. In this example, the message module 114 removes both instances of the object id 123450010 in lines 26 and 34 of the first message and inserts at those locations the reference identifier K2 (see lines 73 and 81 in the body of the second message).

In this example, the cross-referencing section at lines 40-46 of the header of the second message includes a UUID with a value of 20001214145744389999. The UUID is located in line 41 of the second message. The UUID can be used by the receiving system to identify the particular object id being referenced.

When an application reviews the content of the second message and identifies the reference identifier K2 in the header, the application associates the information in the K2 cross-referencing section with the locations of K2 in the body.

Figure 3:
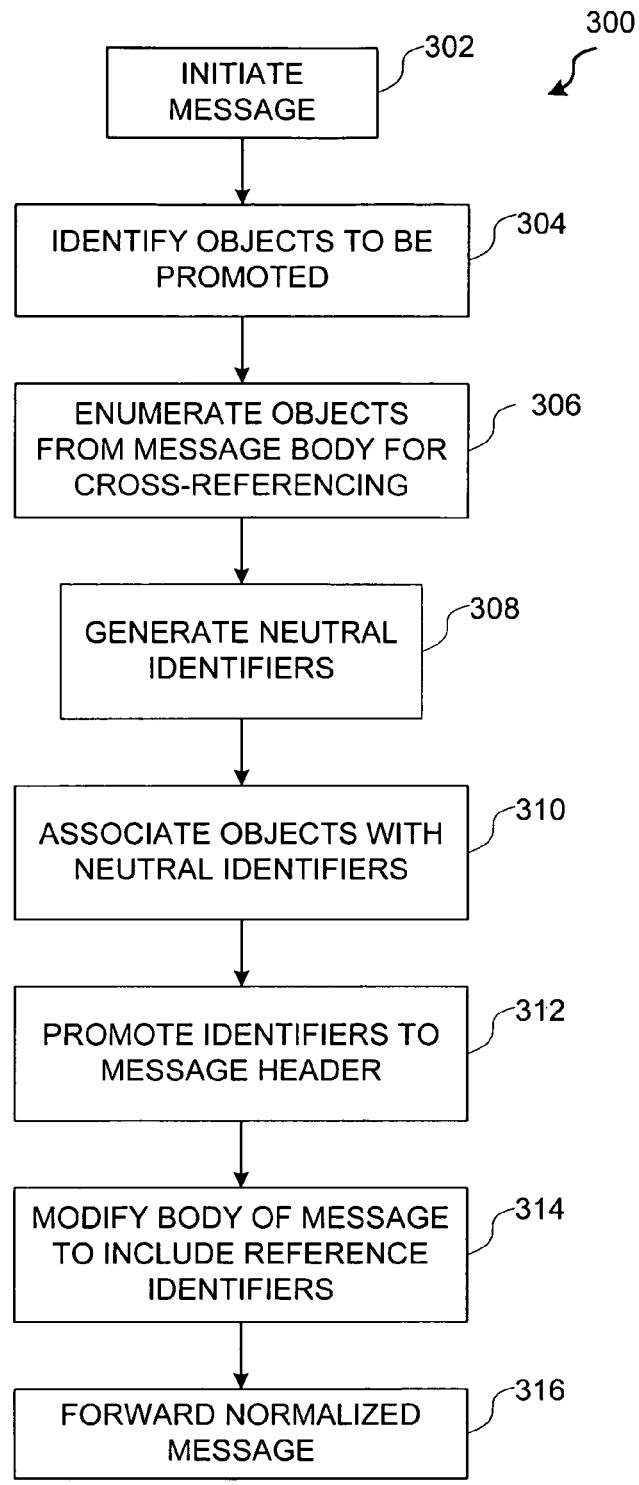
FIG. 3 illustrates a flowchart of the promotion of cross-referencing information in a message.

An exemplary operation of a cross-referencing technique according to the present invention is now described. FIG. 3 illustrates a flowchart 300 of an exemplary process of normalizing a message by using cross-referencing information. While flowchart 300 illustrates some of the steps that are performed in the normalizing process, other combinations of steps may be carried out in variations of this process.

In one example, the process illustrated in FIG. 3 can be practiced by modifying the first message described above into an intermediate message that is sent to the hub 140 by the message module 114.

At step 302, an application initiates a message. The message may contain any content, such as a request for data or an update of data. In one example, the message can be initiated by either the primary system 110 or the legacy system 150. The message is initiated by whichever system or application is the master or owner of the record or records on which the business transaction is based. The master can be referred to as a data center. In this example, the primary system 110 is assumed to have initiated the message.

At this step, the particular content of the body of the message has been developed. In other words, the particular customer related information that form the transaction has been collected and assimilated into the message. In this example, the message at this point resembles the first message as described above.

At step 304, the message module 114 of the primary system 110 reviews the message and identifies the object ids in the body of the message to be cross-referenced in the header in a modified message. Each object id that forms part of a business transaction is usually cross-referenced. In one example, the message module 114 identifies several object ids or id elements in the body of the message. Each id element represents the set of fields in which data is stored for a business object.

At step 306, the message module 114 enumerates from the body of the message these object ids or id elements to be cross-referenced in the header. These object ids are temporarily stored in a memory of message module 114.

At step 308, the message module 114 generates neutral reference identifiers. The reference identifiers may be any type of numerical and/or alphabetic identifier, such as K1, K2, etc. The quantity of reference identifiers generated by the message module 114 corresponds to the quantity of different object ids to be cross-referenced in the header.

At step 310, the message module 114 associates the enumerated object ids with the generated reference identifiers and places the associations into the header of the modified message. For example, the message module 114 associates the object id or value 123450006 for the id element in line 18 in the first message with the reference identifier K3. Reference identifier K3 is subsequently used in the body of the message. In this step, the message module 114 generates a cross-referencing section that can be inserted into the header. The cross-referencing section includes information related to the system id of the primary system 110, the object ids in the body and any reference identifiers.

At step 312, the message module 114 inserts the associations of the particular object ids and the reference identifiers to the header of message. The association is inserted in the form of a cross-referencing section as discussed above.

At step 314, the message module 114 modifies the body of the message to include any appropriate reference identifiers. In one example, the message module 114 replaces line 18 in the first message with line 65 in the second message. Once the cross-referencing information is inserted into the header and the body is modified to include the reference identifiers, the message can be is referred to as a "normalized" message, which is forwarded to the hub 140.

At step 316, the message module 114 forwards the normalized message in a markup language format, such as XML. In one example, the primary system 110 does not need to retain specific information relating to the reference identifiers because the reference identifiers are functional within the message only.

Figure 4:
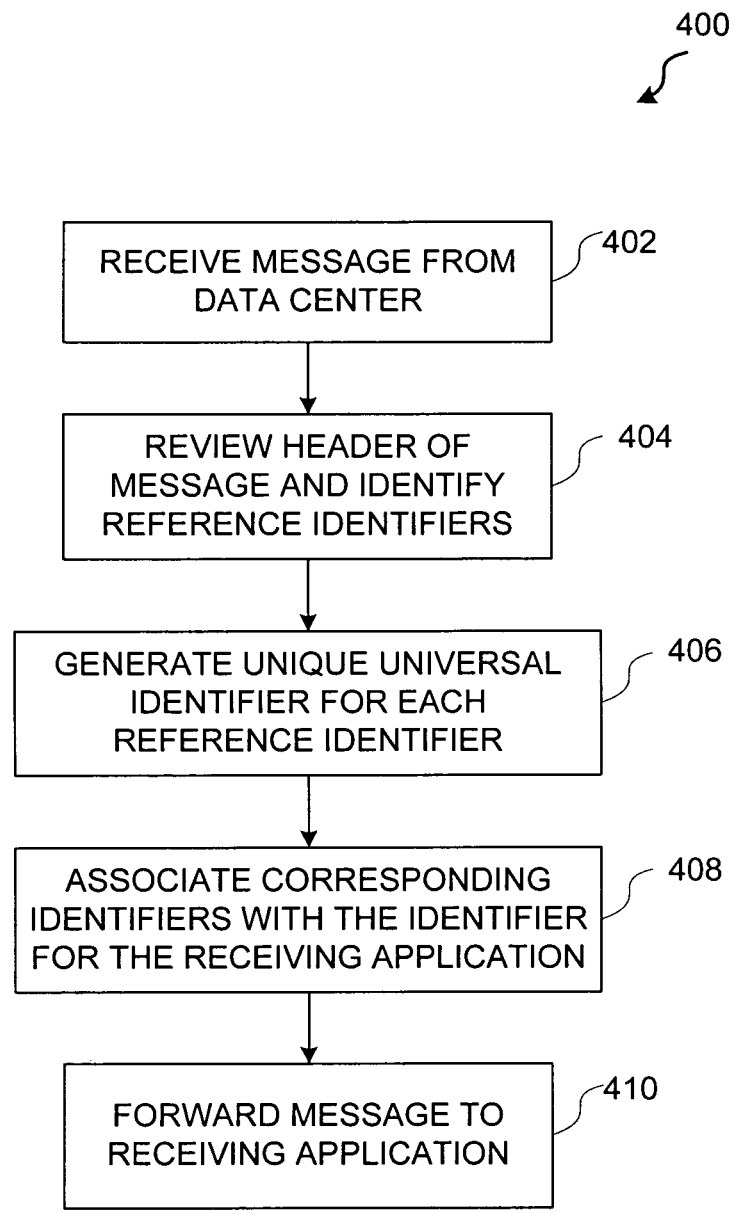
FIG. 4 illustrates a flowchart of the association of reference identifiers.

An exemplary operation performed by the hub on a message from a data center is described. FIG. 4 illustrates a flowchart 400 of an exemplary process of inserting information by the hub 140. While flowchart 400 illustrates some of the steps that are performed in this process, other combinations of steps may be carried out in other variations of this process.

At step 402, the hub 140 receives a message from the data center which in this example, is the primary system 110. The message contains the system id of the primary system 110, and any relevant object ids and reference ids as discussed above.

At step 404, the message module 142 of the hub 140 reviews the header of the message for a system id and any reference identifiers inserted by the primary system 110. For example, the hub 140 reviews the header for any reference identifiers, such as K1, K2, etc. Because the header includes reference identifiers only for promoted objects, the message module 114 can identify the promoted object ids based on the presence of a reference identifier in the header. Accordingly, the hub 140 only needs to review the contents of the header, thereby saving time in the transmission of the message between systems.

At step 406, the hub 140 generates a unique hub identifier for each different reference identifier in message. Each unique hub identifier may contain numeric and/or alphabetic characters. In one example, the unique hub identifier is the UUID discussed above. The hub 140 associates a unique hub identifier with each reference identifier in the message.

At step 408, the hub 140 matches the associated unique hub identifier and reference identifier with a legacy system object id that is provided by or associated with the legacy system 150. In one example, the hub 140 maintains a relationship between the unique hub identifiers, the reference identifiers, and the object ids for the primary system 110 and the legacy system 150 while the hub 140 is processing the message.

In another example, the hub 140 only includes the unique hub identifier, the reference identifiers, and the object ids of the primary system 110.

At step 410, the hub 140 forwards the modified message to the legacy system 150. An example of such a message is the second message discussed above. In one example, the legacy system 150 can identify the reference identifiers, such as K1, K2, etc., used in the message and be able to de-normalize or extract the relevant data from the header of the message.

Figure 5:
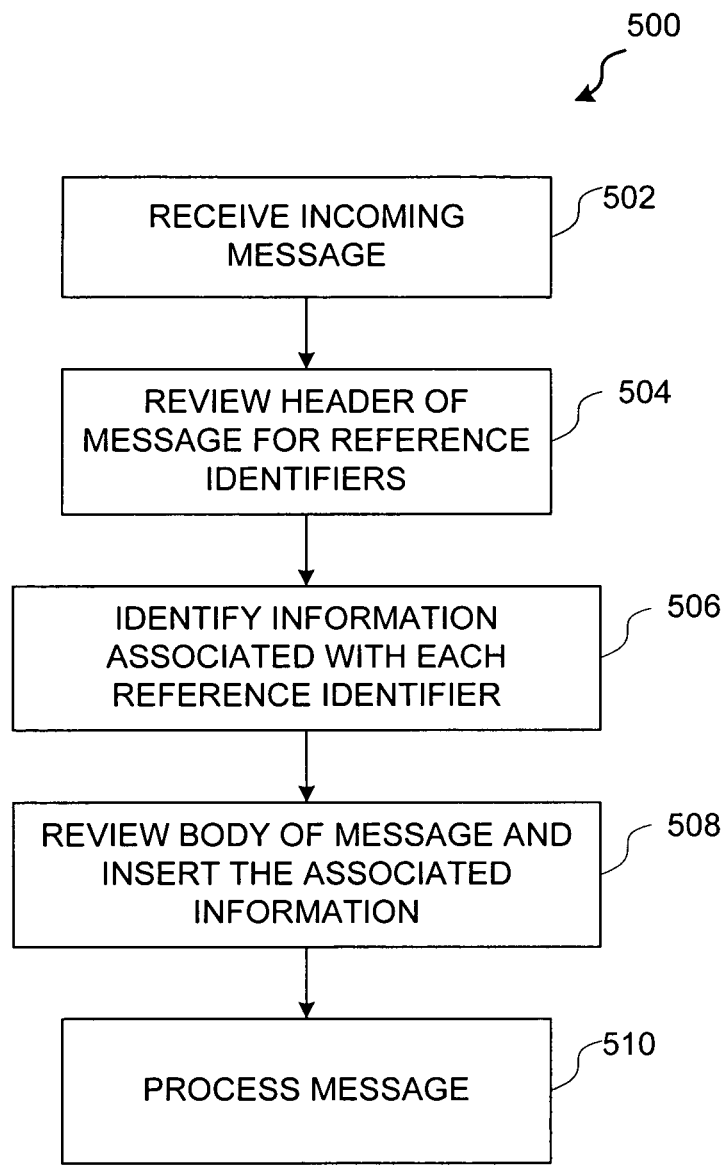
FIG. 5 illustrates a flowchart of the processing of an incoming message.

An exemplary operation of a technique associated with the receipt of a message with cross-referencing information is now described. FIG. 5 illustrates a flowchart 500 of an exemplary process of processing a message that includes cross-referencing information. While flowchart 500 illustrates some of the steps that are performed in the processing method, other combinations of steps may be carried out in variations of this process.

At step 502, the receiving system receives the incoming message from the hub 140. In one example, the receiving system is assumed to be the legacy system 150.

At step 504, the receiving system reviews the header of the 200 for reference identifiers. For example, while an object id of the primary system 110 may not be recognizable by the legacy system 150, the legacy system 150 may use the UUID to match the particular object id to its own.

At step 506, the legacy system 150 identifies the information in the header for each reference identifier.

At step 508, the legacy system 150 reviews the body of the received message and pulls the information from the header that corresponds to each of the reference identifiers. For example, the legacy system 150 reviews the body and identifies K3 as a reference identifier. The legacy system 150 then utilizes the information in the cross-referencing section related to K3, including the value of 123450006, in the body at the location of K3. This process can be referred to as the "denormalization" of the message. A denormalized message is a message that formatted for a particular application or system.

At step 510, the legacy system 150 processes the message using any conventional technique. For example, the legacy system 150 performs any updates to the data in the legacy system database 160.

Alternatively, the legacy system 150 can prepare a return message to the primary system 110 with any requested data. In this alternative scenario, the flowcharts 300, 400, and 500 can be repeated with the legacy system 150 as the data center that sends the message and the primary system 110 as the receiving system.

In one embodiment, when the primary system 110 receives a message from the hub 140 or the legacy system 150, the primary system 110 saves the header instance and tags it back to the response message that it returns. The tagging back of the header instance increases the responsiveness of a receiving system to requests from a data center because the system id and the relevant object is of the primary system 110 and the legacy system 150 are already part of the message.

Figure 6:
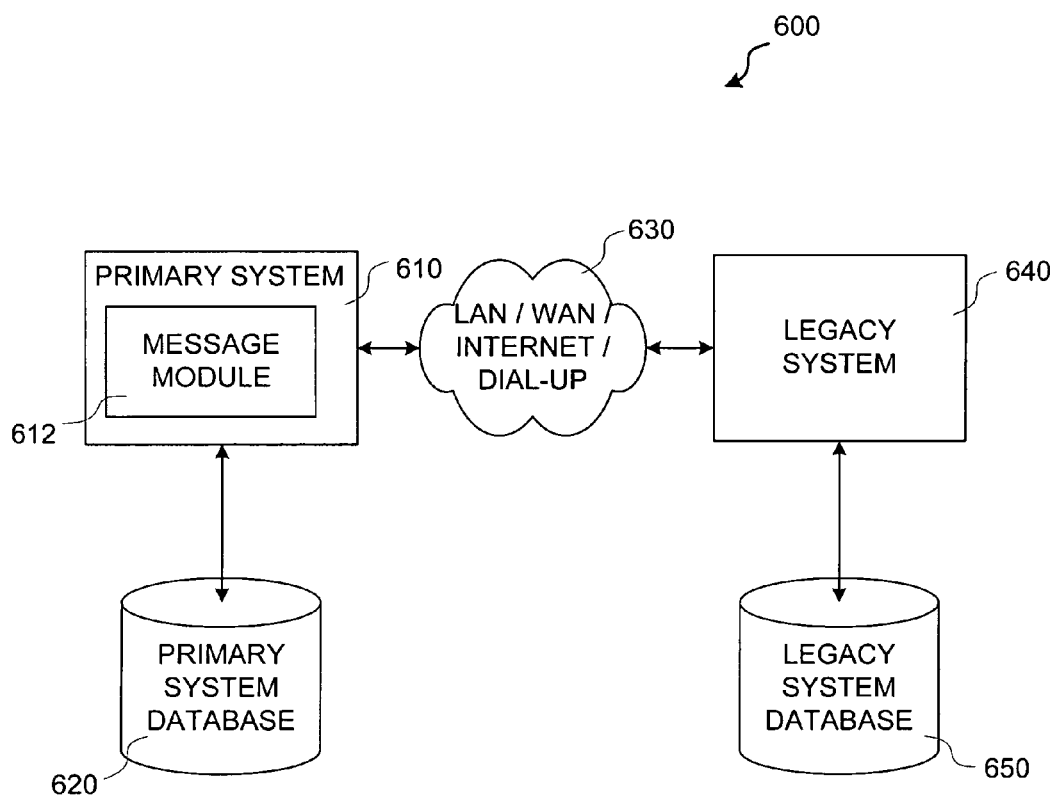
FIG. 6 illustrates a diagram of an alternative operating environment in which the invention can be practiced.

A schematic diagram of an alternative embodiment of an enterprise system is illustrated in FIG. 6. In this example, the enterprise system 600 includes a primary system 610 that can be similar to primary system 110 described relative to FIG. 1. The enterprise system 600 also includes a primary system database 620 that is connected to or associated with the primary system 610.

The enterprise system 600 also includes a legacy system 640 and an associated legacy system database 650. The legacy system database 650 is connected to or associated with the legacy system 640. The legacy system 640 and database 650 can be similar to legacy system 150 and database 160, respectively.

In this example, the primary system 610 includes a message module 612 that generates outgoing messages to legacy system 640 and processes incoming messages from legacy system 640.

As evident from FIG. 6, enterprise system 600 does not include a hub. Thus, in this example, the primary system 610 is connected to the legacy system 640 via communication 630. Communication 630 is similar to communication 130 discussed above.

In this example, the legacy system 640 is configured to utilize the system id and the object ids directly from the primary system 110 without any UUID. In another example, the legacy system 640 is configured to be able to identify the UUIDs in a message from the primary system 610. The UUIDs eliminate the need for the association of identifiers by the hub, and thus, eliminates the need for a hub.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. The previous description of exemplary embodiments is provided to enable any person skilled in the art to make or use the invention. While the invention has been particularly shown and described with reference to exemplary embodiments thereof, it will be understood by those skilled in the art that various changes in form and details may be made therein without departing from the spirit and scope of the invention.

What is claimed is:

1. A computer-implemented method comprising:
    generating a message using a first data system, wherein
        the message is related to a transaction between the first data system and a second data system,
        the message comprises information that relates to a first data record of a plurality of data records on the first data system and to a second data record of a plurality of data records on the second data system, wherein the first data record is in a first table in the first data system, the second data record is in a second table in the second data system, the first table is distinct from the second table, the first table comprises a first identifier for the first data record, the second table comprises a second identifier for the second data record, the first identifier is distinct from the second identifier, the information indicates that the intermediate identifier is associated with the first and second identifiers, and wherein the information indicates a system identifier for the first data system and a system identifier for the second data system,
        the information associates a relationship between an object identifier corresponding to the first data record and a generic reference identifier;
    transmitting the message to an intermediate hub that is separate from the first data system and from the second data system; and
    receiving the message at the intermediate hub, wherein
        the intermediate hub is configured to determine that the object identifier corresponding to the first data record needs to be updated based upon identifying the generic reference identifier,
        the intermediate hub is configured to determine a corresponding identifier for the second data record based at least in part on the object identifier corresponding to the first data record, the intermediate hub is configured to modify the message by replacing the object identifier corresponding to the first data record referenced in the message with the corresponding identifier for the second data record the intermediate hub is configured to transmit the modified message to the second data system for processing, and the intermediate hub being configured to modify any messages transmitted from the second data system to the first data system by replacing the corresponding identifier for the second data record with the object identifier corresponding to the first data record.

2. The method of claim 1, wherein the message comprises a body, the method further comprising:

including identifying information in the body, wherein the identifying information identifies the plurality of data records on the first data system and the plurality of data records on the second data system.

3. The method of claim 1, wherein the information comprises:

a unique identifier corresponding to the first and second data records.

4. A system comprising:

means for generating a message, wherein
the message is related to a transaction between a first data system and a second data system,
the message comprises information that relates to a first data record of a plurality of data records on the first data system and to a second data record of a plurality of data records on the second data system, wherein the first data record is in a first table in the first data system, the second data record is in a second table in the second data system, the first table is distinct from the second table, the first table comprises a first identifier for the first data record, the second table comprises a second identifier for the second data record, the first identifier is distinct from the second identifier, the information indicates that the intermediate identifier is associated with the first and second identifiers, and wherein the information indicates a system identifier for the first data system and a system identifier for the second data system,
the information associates a relationship between an object identifier corresponding to the first data record and a generic reference identifier;

means for transmitting the message to an intermediate hub that is separate from the first data system and from the second data system; and means for receiving the message at the intermediate hub, wherein
the intermediate hub is configured to determine that the object identifier corresponding to the first data record needs to be updated based upon identifying the generic reference identifier,
the intermediate hub is configured to determine a corresponding identifier for the second data record based at least in part on the object identifier corresponding to the first data record,
the intermediate hub is configured to modify the message by replacing the object identifier corresponding to the first data record referenced in the message with the corresponding identifier for the second data record,
the intermediate hub is configured to transmit the modified message to the second data system for processing, and
the intermediate hub being configured to modify any messages transmitted from the second data system to the first data system by replacing the corresponding identifier for the second data record with the object identifier corresponding to the first data record.

5. The system of claim 4, wherein:

the message comprises a body;

the processor is configured to create an identifying information in the body; and the identifying information identifies the plurality of data records on the first data system and the plurality of data records on the second data system.

6. The system of claim 4, further comprising:

means for creating, in the message, a unique identifier corresponding to the first and second data records.

7. A non-transitory computer-readable storage medium having encoded thereon program instructions executable by a processor, the program instructions comprising:

instructions for generating a message using a first data system, wherein
the message is related to a transaction between the first data system and a second data system,
the message comprises information that relates to a first data record of a plurality of data records on the first data system and to a second data record of a plurality of data records on the second data system, wherein the first data record is in a first table in the first data system, the second data record is in a second table in the second data system, the first table is distinct from the second table, the first table comprises a first identifier for the first data record, the second table comprises a second identifier for the second data record, the first identifier is distinct from the second identifier, the information indicates that the intermediate identifier is associated with the first and second identifiers, and wherein the information indicates a system identifier for the first data system and a system identifier for the second data system,
the information associates a relationship between an object identifier corresponding to the first data record and a generic reference identifier; and instructions for transmitting the message to an intermediate hub that is separate from the first data system and from the second data system,
the intermediate hub being configured to modify the message by replacing the object identifier corresponding to the first data record with a corresponding identifier for the second data record that is referenced using the object identifier corresponding to the first data record.

8. The non-transitory computer-readable storage medium of claim 7, wherein the message comprises a body, the program instructions further comprising:

instructions for including identifying information in the body, wherein the identifying information identifies the plurality of data records on the first data system and the plurality of data records on the second data system.

9. The non-transitory computer-readable storage medium of claim 7, wherein the instructions for generating comprise:

instructions for creating, in the message, a unique identifier corresponding to the first and second data records.

10. A system comprising:

a memory; and at least one processor, wherein the processor is configured to execute instructions stored in the memory for generating a message using a first data system, wherein
the message is related to a transaction between the first data system and a second data system,
the message comprises information that relates to a first data record of a plurality of data records on the first data system and to a second data record of a plurality of data records on the second data system, wherein the first data record is in a first table in the first data system, the second data record is in a second table in the second data system, the first table is distinct from the second table, the first table comprises a first identifier for the first data record, the second table comprises a second identifier for the second data record, the first identifier is distinct from the second identifier, the information indicates that the intermediate identifier is associated with the first and second identifiers, and wherein the information indicates a system identifier for the first data system and a system identifier for the second data system, and
providing the message to an intermediate hub that is configured to insert mapping information in the message, the intermediate hub being separate from the first data system and the second data system, wherein
the mapping information indicates a relationship between the first data record among the plurality of data records on the first data system and the second data record among the plurality of data records on the second data system.

11. The system of claim 10, wherein the message comprises a body, and the processor is configured to execute instructions stored in the memory for:
including identifying information in the body, wherein the identifying information identifies the plurality of data records on the first data system and the plurality of data records on the second data system.

12. The system of claim 10, wherein the processor is configured to execute instructions stored in the memory for:
generating a reference identifier, wherein the reference identifier is associated with the first and second data records.

13. The system of claim 10, wherein the processor is configured to execute instructions stored in the memory for:
creating, in the message, a unique identifier corresponding to the first and second data records.

14. The system of claim 10, wherein the message comprises a body and multiple instances of the first data record in the body, and the generating of the message comprises:
associating a reference identifier with each instance of the first data record in the message.

15. A computer-implemented method comprising:
generating a message using a first system, wherein
the message is related to a transaction between the first data system and a second data system,
the transaction is related to a first data record of the first data system,
the first data record corresponds to a second data record of the second data system,
the first data record is identified by a first identifier,
wherein the first data record is in a first table in the first data system, the second data record is in a second table in the second data system, the first table is distinct from the second table, the first table comprises a first identifier for the first data record, the second table comprises a second identifier for the second data record, the first identifier is distinct from the second identifier, the information indicates that the intermediate identifier is associated with the first and second identifiers, and wherein the information indicates a system identifier for the first data system and a system identifier for the second data system; and
transmitting the message to an intermediate hub that is separate from the first data system and from the second data system, wherein
before transmitting the message to the second data system, the intermediate hub is configured to modify the message so that the first identifier referencing the first data record is replaced with the second identifier referencing the second data record, wherein the second data system recognizes the second identifier but not the first identifier.

* * * * *

UNITED STATES PATENT AND TRADEMARK OFFICE
CERTIFICATE OF CORRECTION

PATENT NO. : 9,881,068 B2
APPLICATION NO. : 11/401790
DATED : January 30, 2018
INVENTOR(S) : Yeap et al.

Page 1 of 1

It is certified that error appears in the above-identified patent and that said Letters Patent is hereby corrected as shown below:

In the Specification

In Column 1, Line 10, delete "now U.S. Pat. No. 7,743,065".

In Column 2, Line 5, delete "table" and insert -- table, --, therefor.

In Column 6, Line 25, delete "below" and insert -- below, --, therefor.

In Column 9, Line 1, delete "Without" and insert -- With --, therefor.

In Column 9, Line 68 in the code, delete "Oustanding" and insert -- Outstanding --, therefor.

In Column 14, Line 36, delete "identifier" and insert -- identifier, --, therefor.

In Column 16, Line 31, delete "center" and insert -- center, --, therefor.

Signed and Sealed this
Fourteenth Day of August, 2018

Andrei Iancu
*Director of the United States Patent and Trademark Office*